(12) United States Patent
Patel

(10) Patent No.: US 9,144,334 B2
(45) Date of Patent: Sep. 29, 2015

(54) DUAL-CHAMBER TEAPOT

(71) Applicant: Parag S. Patel, Upland, CA (US)

(72) Inventor: Parag S. Patel, Upland, CA (US)

( * ) Notice: Subject to any disclaimer, the term of this patent is extended or adjusted under 35 U.S.C. 154(b) by 0 days.

(21) Appl. No.: 14/179,363

(22) Filed: Feb. 12, 2014

(65) Prior Publication Data

US 2015/0013548 A1   Jan. 15, 2015

Related U.S. Application Data

(62) Division of application No. 13/941,307, filed on Jul. 12, 2013.

(51) Int. Cl.
*A47G 19/14* (2006.01)
*A47J 31/46* (2006.01)
*A47J 31/40* (2006.01)

(52) U.S. Cl.
CPC .............. *A47G 19/14* (2013.01); *A47J 31/407* (2013.01); *A47J 31/46* (2013.01)

(58) Field of Classification Search
CPC ...... C12C 13/10; C12C 11/003; C12C 11/006
USPC ................................. 99/276–323.3
See application file for complete search history.

(56) References Cited

U.S. PATENT DOCUMENTS

| 1,485,737 | A | * | 3/1924 | Stordahl | 294/86.4 |
| 2,126,201 | A | * | 8/1938 | McCall | 16/434 |
| 2,600,318 | A | * | 6/1952 | Patrignani | 30/64 |
| 2,628,553 | A |   | 2/1953 | Titus | |
| 2,734,983 | A | * | 2/1956 | Krichton | 219/448.17 |
| 2,741,902 | A | * | 4/1956 | Thompson | 222/109 |
| 6,161,720 | A | * | 12/2000 | Castle | 220/592.17 |
| 7,032,507 | B2 |   | 4/2006 | Cai | |
| 2003/0192434 | A1 |   | 10/2003 | Koslow | |
| 2011/0271842 | A1 |   | 11/2011 | Garvey | |

* cited by examiner

*Primary Examiner* — Tu B Hoang
*Assistant Examiner* — Thomas Ward
(74) *Attorney, Agent, or Firm* — Christie, Parker & Hale, LLP

(57) ABSTRACT

A dual-chamber teapot configured for stovetop preparation. In one embodiment, the dual-chamber teapot includes an exterior body portion defining a cavity and an interior body portion housed in the cavity. The teapot also includes a spout projecting outward from the exterior body portion. An inner chamber is defined by the interior body portion and an outer chamber is defined between the exterior body portion and the interior body portion. The inner chamber is in fluid communication with the outer chamber and the outer chamber is in fluid communication with the spout.

14 Claims, 7 Drawing Sheets

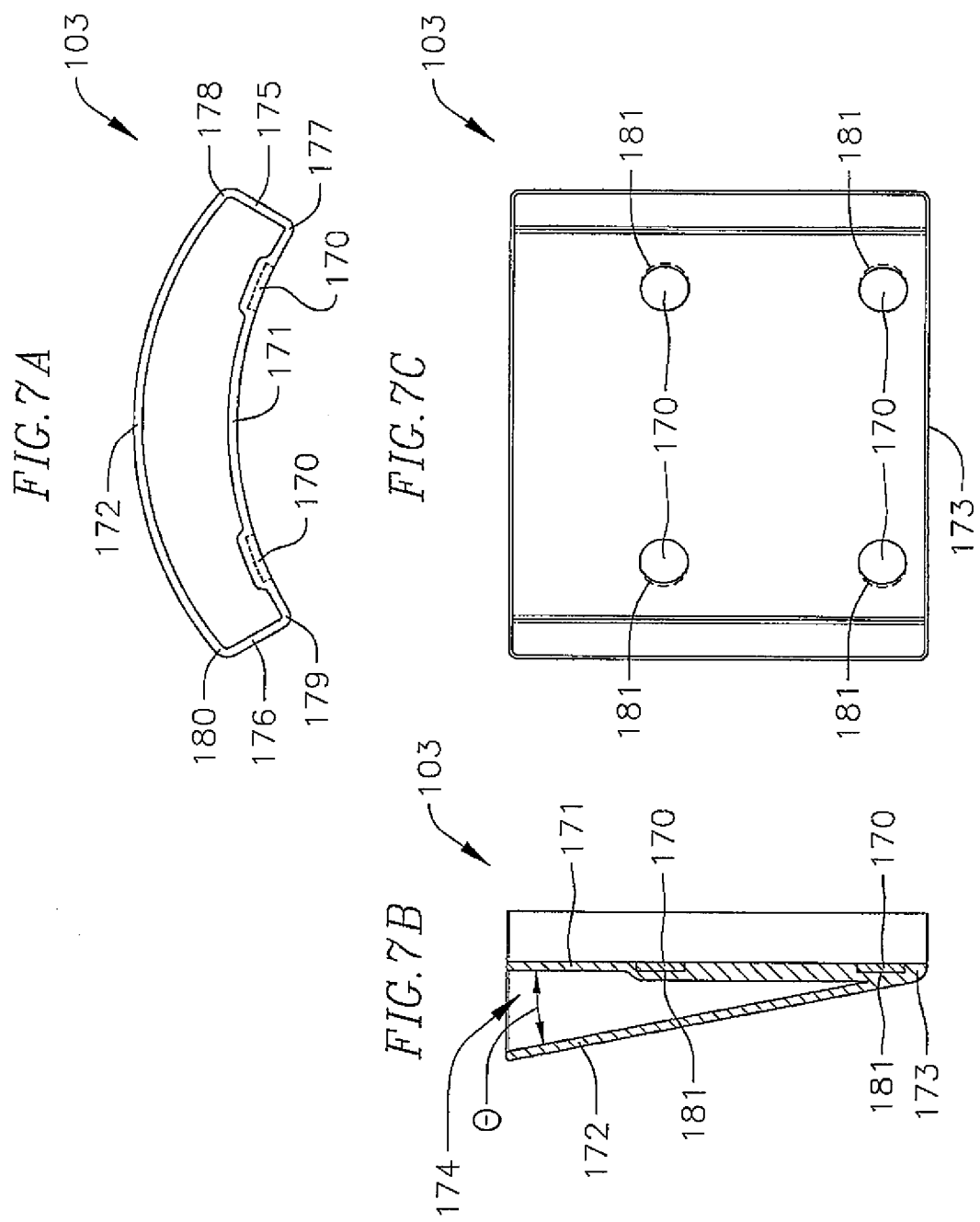

DUAL-CHAMBER TEAPOT

CROSS-REFERENCE TO RELATED APPLICATION

This application is a divisional of U.S. application Ser. No. 13/941,307, filed Jul. 12, 2013, the entire content of which is incorporated herein by reference.

FIELD

The present application relates generally to beverage preparation devices and, more particularly, to stovetop teapots.

BACKGROUND

Conventional stovetop teapots are ubiquitous. Conventional teapots typically include a single chamber into which a variety of ingredients (e.g., milk, water, spices, tea leaves) may be placed and then brought to a boil or other suitably high temperature.

However, conventional stove-top teapots are prone to overflow when the tea is brought to a boil (i.e., the tea is prone to overflow onto the stove). Additionally, conventional teapots are prone to spilling when the tea is poured from the teapot. Furthermore, conventional teapots become very hot on the stovetop. Accordingly, some conventional stovetop teapots include special materials or coatings configured to protect the user during handling of the teapot. However, such materials or coatings may be costly. Additionally, other conventional teapots require the user to don protective wear (e.g., oven mitts) when handling the teapot. However, it may be cumbersome for the user to handle the teapot while wearing oven mitts. Additionally, oven mitts reduce the user's tactile sensation of the teapot, which may lead to mishandling of the teapot. Furthermore, larger ingredients, such as cinnamon sticks or ginger roots, may obstruct or prevent the flow of tea out of spouts in conventional teapots.

SUMMARY

The present disclosure is directed to various embodiments of a teapot. According to one embodiment of the present disclosure, a dual-chamber teapot is provided. The dual-chamber teapot includes an exterior body portion defining a cavity, an interior body portion housed in the cavity, and a spout projecting from the exterior body portion. An inner chamber is defined by the interior body portion and an outer chamber is defined between the exterior body portion and the interior body portion. The inner chamber is in fluid communication with the outer chamber and the outer chamber is in fluid communication with the spout. The dual-chamber teapot also includes an opening in an upper end of the interior body portion and a fluid-permeable lid configured to cover the opening. In one embodiment, the fluid-permeable lid includes a porous mesh screen configured to filter solid matter. The dual-chamber teapot also includes a locking member configured to selectively secure the cover to the interior body portion and selectively release the cover from the interior body portion. In one embodiment, the locking member includes a post housed in the inner chamber and a thumb nut threadedly engageable with an upper end of the post. In one embodiment, the exterior body portion includes a cylindrical sidewall and a base extending along a lower end of the cylindrical sidewall. The dual-chamber teapot also includes a lid configured to cover an upper opening in the exterior body portion.

According to another embodiment of the present disclosure, a teapot configured to reduce spill during pouring of a fluid contained in the teapot is provided. The teapot includes an exterior body portion defining a cavity. The exterior body portion includes an upper opening and a sloped upper rim extending around a periphery of the upper opening. The teapot also includes a spout projecting from the exterior body portion, which is in fluid communication with the cavity. In one embodiment, the sloped upper rim tapers between a higher end proximal to the spout and a lower end distal from the spout. The teapot also includes a sloped lid configured to cover the upper opening in the exterior body portion. In one embodiment, the teapot also includes an interior body portion housed in the cavity of the exterior body portion. An inner chamber is defined by the interior body portion and an outer chamber is defined between the exterior body portion and the interior body portion. The inner chamber is in fluid communication with the outer chamber and the outer chamber is in fluid communication with the spout.

According to a further embodiment of the present disclosure, a heat sinking teapot is provided. The heat sinking teapot includes an exterior body portion, a spout coupled to the exterior body portion, and a handle coupled to the exterior body portion. The exterior body portion defines a cavity configured to store a fluid and the spout is in fluid communication with the cavity. The handle includes a series of helically wound strands configured to dissipate heat. In one embodiment, the handle includes an inner segment of closely wound strands and an outer segment of loosely wound strands. In one embodiment, the handle includes between three and five strands. In one embodiment, the heat sinking teapot also includes an interior body portion housed in the cavity of the exterior body portion. An inner chamber is defined by the interior body portion and an outer chamber is defined between the exterior body portion and the interior body portion. The inner chamber is in fluid communication with the outer chamber and the outer chamber is in fluid communication with the spout.

According to another embodiment of the present disclosure, a teapot includes an exterior body portion, a spout coupled to the exterior body portion, and a spill catcher coupled to the exterior body portion below the spout. The exterior body portion defines a cavity configured to store a fluid and the spout is in fluid communication with the cavity. The spill catcher is configured to catch fluid spilled from the spout of the teapot. In one embodiment, the spill catcher is detachably coupled to the exterior body portion of the teapot by a series of magnets. In one embodiment, the spill catcher defines a wedge-shaped cavity configured to receive fluid spilled from the spout. Additionally, in one embodiment, the spill catcher tapers between a upper portion and relatively narrower lower portion. In one embodiment, the teapot also includes a spillway on the exterior body portion. The spillway is configured to direct fluid spilled from the spout into the spill catcher.

This summary is provided to introduce a selection of concepts that are further described below in the detailed description. This summary is not intended to identify key or essential features of the claimed subject matter, nor is it intended to be used in limiting the scope of the claimed subject matter.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

FIGS. 7A-7C are a top plan view, a cross-sectional view, and a back view, respectively, of the spill catcher according to one embodiment of the present disclosure.

DETAILED DESCRIPTION

The present disclosure is directed to various embodiments of a teapot. One or more embodiments of the teapot are dual-chambered, which is configured to prevent fluid overflow during preparation of the tea. Additionally, one or more embodiments of the teapot include a heat sinking handle configured to dissipate heat from the teapot to facilitate handling of teapot without protective wear. Furthermore, one or more embodiments of the teapot include a spill catcher configured to collect liquid spilled from the teapot. Moreover, one or more embodiments of the teapot include a sloped upper rim and corresponding sloped cover configured to reduce spilling from the teapot. Furthermore, one or more embodiments of the teapot include a filter configured to catch large solid objects and prevent the objects from obstructing the flow of tea from the teapot.

Figure 1:
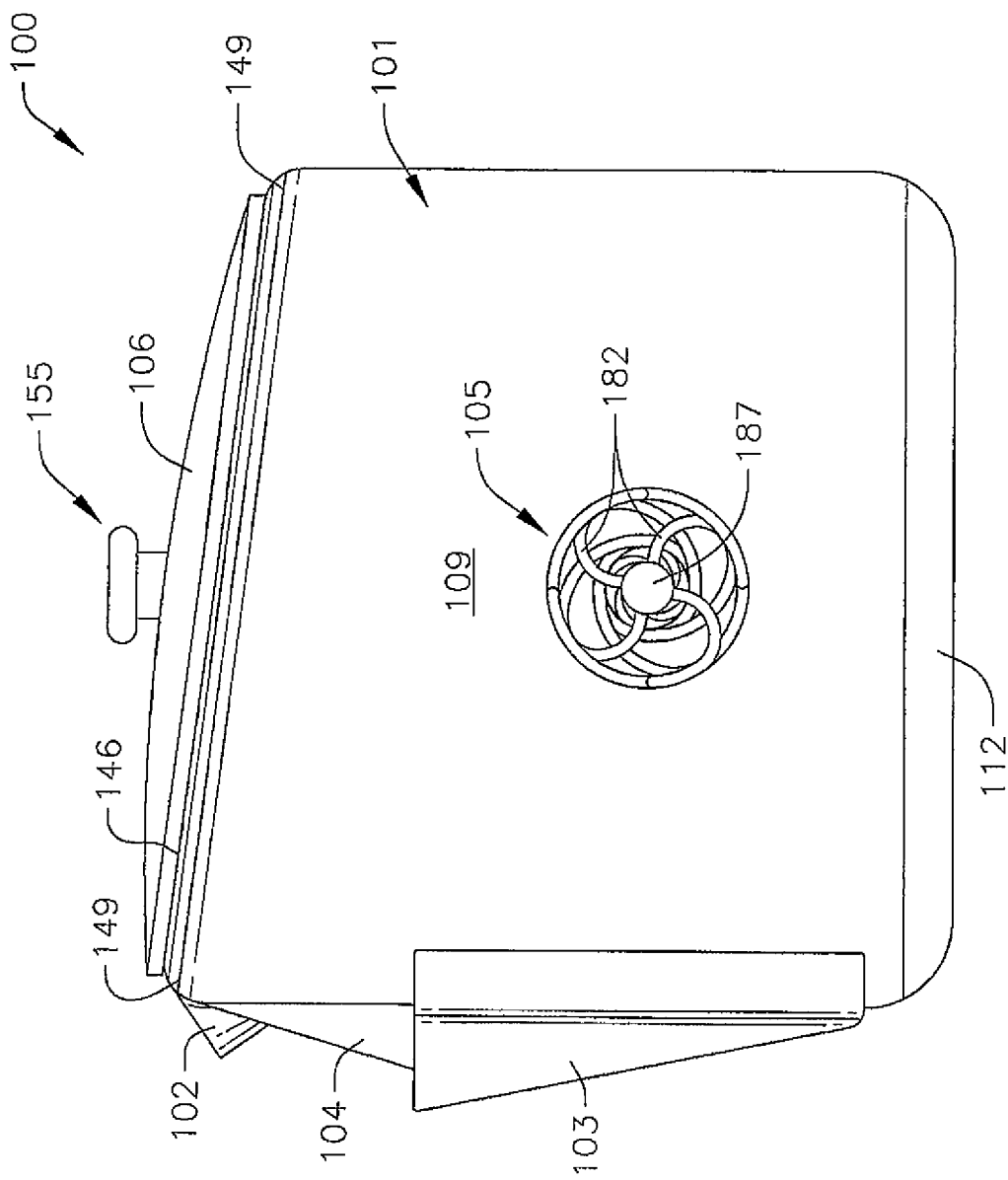
FIG. 1 is a side view of a teapot having a body portion, an outer lid, a handle, and a spill catcher according to one embodiment of the present disclosure.
Figure 2:
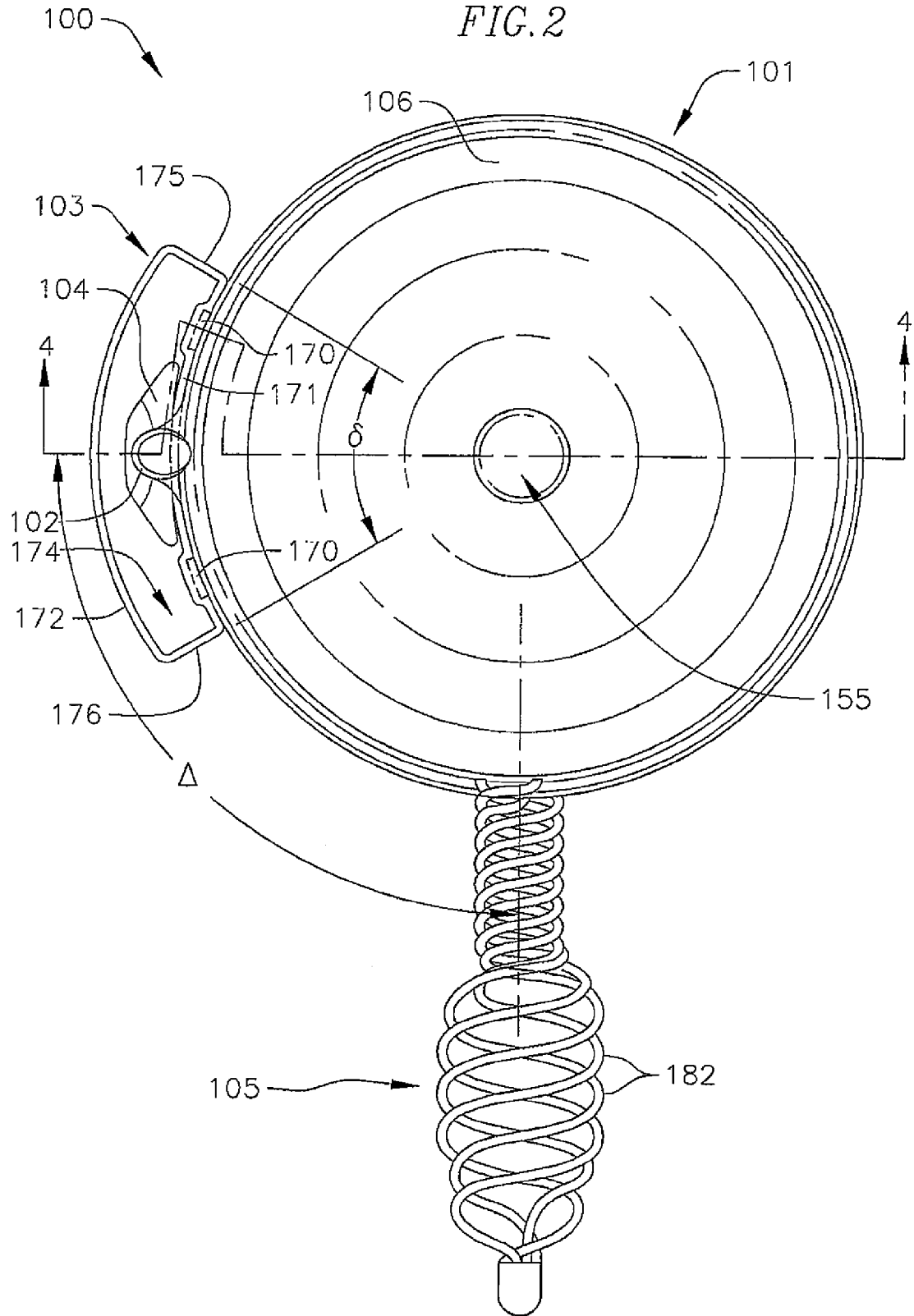
FIG. 2 is a top plan view of the teapot illustrated in FIG. 1.

With reference now to the embodiment illustrated in FIGS. 1 and 2, the teapot 100 includes a body 101 and a spout 102 projecting outward from the body 101. The teapot 100 also includes a spill catcher 103 coupled to the body 101 and disposed below the spout 102. The spill catcher 103 is configured to capture fluid spilled from the spout 102, as described below. The teapot 100 may also include a spillway 104 on the body 101 configured to direct fluid spilled from the spout 102 into the spill catcher 103. Additionally, the teapot 100 may include a handle 105 coupled to the body 101. As described in more detail below, the handle 105 may be configured to dissipate heat and thereby facilitate grasping of the handle 105 without the use of protective wear, such as an oven mitt. The teapot 100 may also include a removable outer lid 106 configured both to permit the user to place the constituent ingredients of a beverage (e.g., milk, water, tea leaves, and spices) into the teapot 100 for preparation and to prevent fluid from spilling out of the teapot 100 while pouring the prepared beverage from the spout 102.

Figure 3:
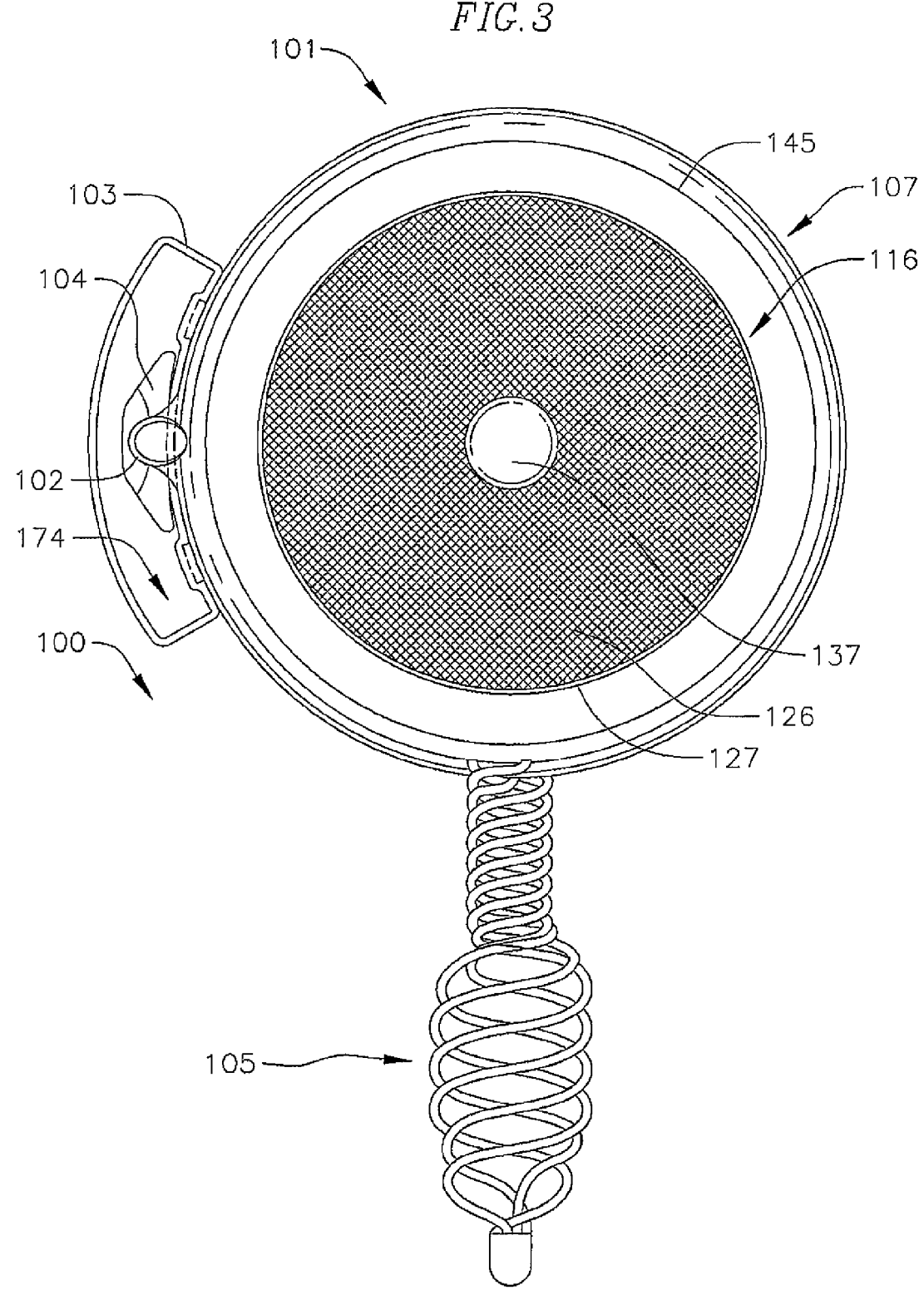
FIG. 3 is a top plan view of the teapot illustrated in FIG. 1 with the lid omitted to reveal the inner lid.
Figure 4:
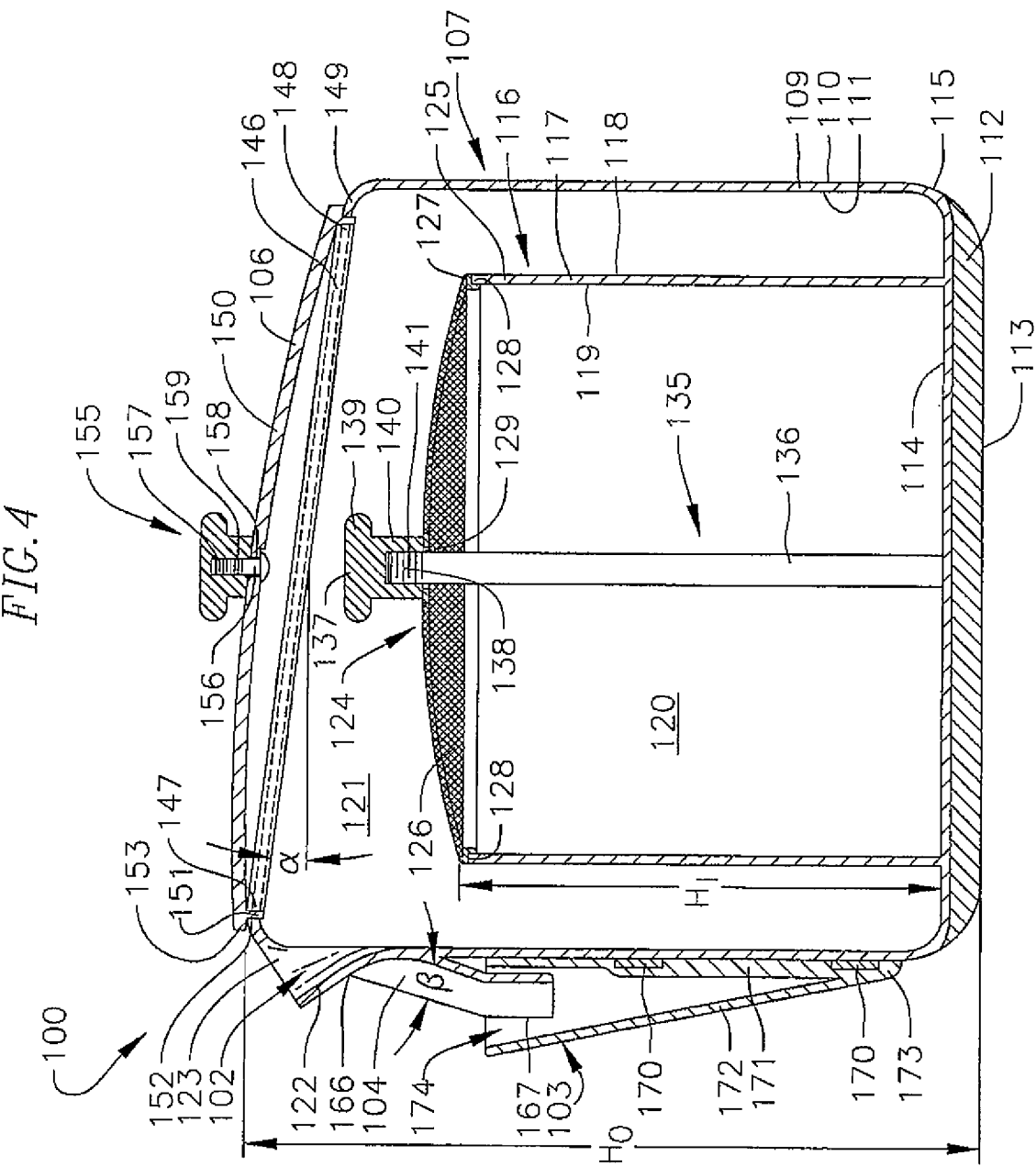
FIG. 4 is a cross-sectional view of the teapot illustrated in FIG. 2 taken along line A-A.
Figure 5:
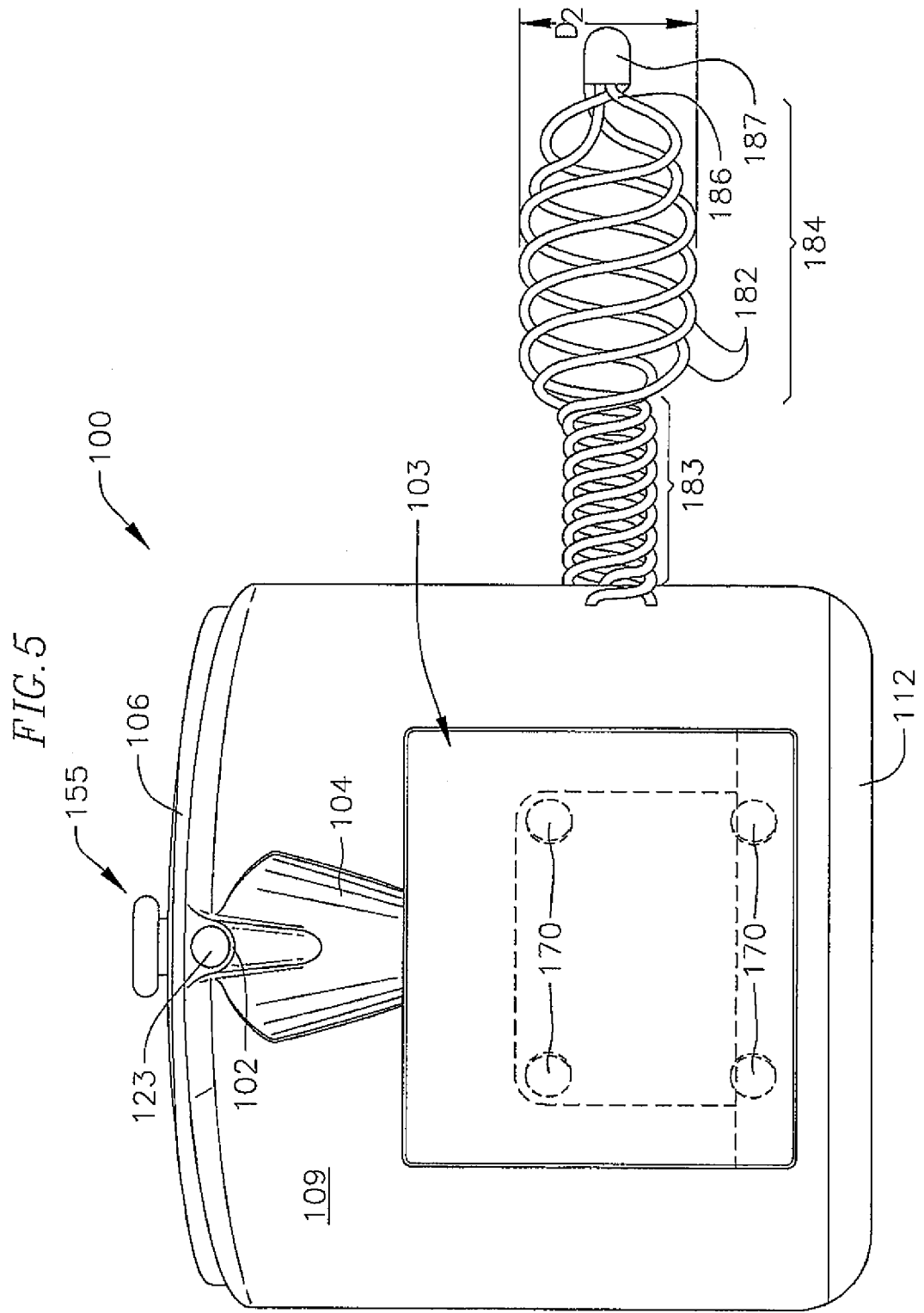
FIG. 5 is a front view of the teapot illustrated in FIG. 1.
Figure 6:
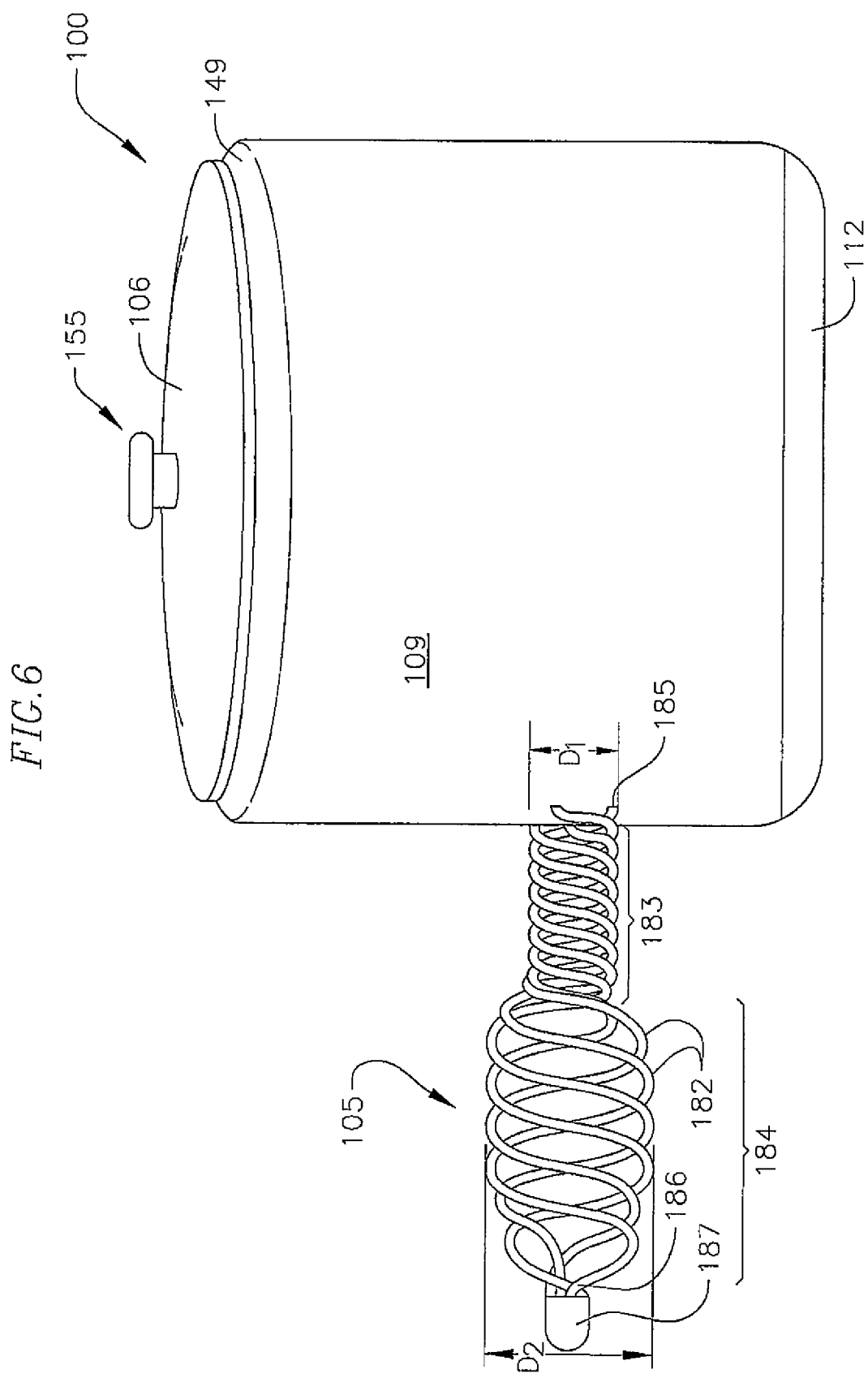
FIG. 6 is a back view of the teapot illustrated in FIG. 1.

With reference now to the embodiment illustrated in FIGS. 3 and 4, the body 101 of the teapot 100 includes an outer body portion 107. The outer body 107 portion includes a sidewall 109 having an outer surface 110 and an inner surface 111 opposite the outer surface 110, and a base 112 having an outer surface 113 and an inner surface 114 opposite the outer surface 113. The base 112 extends along a lower end 115 of the sidewall 109. In the illustrated embodiment, the sidewall 109 is generally cylindrical and the base 112 is a generally flat, circular plate. It will be appreciated, however, that the sidewall 109 and the base 112 of the outer body portion 107 may have any other suitable shapes. In one alternate embodiment, for instance, the sidewall 109 of the outer body portion 107 may be a square prism and the base 112 may be a flat, square plate. In another alternate embodiment, for instance, the sidewall 109 of the outer body portion 107 may be semi-spherical and the base 112 may be a flat, circular plate. The sidewall 109 and the base 112 of the outer body portion 107 may be made of dissimilar materials. In one embodiment, for instance, the sidewall 109 may be made out of aluminum and the base 112 may be made out of copper or other material having high thermal conductivity. It will be appreciated, however, that the sidewall 109 and the base 112 of the outer body portion 107 may be made out of any other suitable materials, such as, for instance, metal alloys, steel, precious metals, ceramic, or any combinations thereof. Additionally, it will be appreciated that the sidewall 109 and the base 112 of the outer body portion 107 may be made of the same or similar materials and still fall within the scope and spirit of the present disclosure. Furthermore, in one embodiment, the inner surfaces 111, 114 of the sidewall 109 and the base 112, respectively, are coated with a non-stick material, such as polytetrafluoroethylene (PTFE) or anodized aluminum.

With continued reference to the embodiment illustrated in FIGS. 3 and 4, the body 101 of the teapot 100 also includes an inner body portion 116 housed inside the outer body portion 107. The inner body portion 116 includes a sidewall 117 projecting upward from the base 112 of the outer body portion 107. The sidewall 117 of the inner body portion 116 includes an outer surface 118 and an inner surface 119 opposite the outer surface 118. In one embodiment, the sidewall 117 of the inner body portion 116 is generally cylindrical, as illustrated in FIG. 3, although it will be appreciated that sidewall 117 of the inner body portion 116 may have any other suitable shape, such as, for instance, a square prism, a rectangular prism, or even an irregular shape. Additionally, in the illustrated embodiment, a height $H_I$ of the sidewall 117 of the inner body portion 116 is less than a height $H_O$ of the sidewall 109 of the outer body portion 107, the significance of which is described below. The inner body portion 116 may be formed separately from the outer body portion 107 and subsequently coupled to the base 112 of the outer body portion 107 by any suitable means, such as, for example, bonding, welding, adhering, or mechanical fastening. In an alternate embodiment, the inner body portion 116 may be integrally formed with the outer body portion 107. In one embodiment, at least a portion of the outer surface 118 and/or the inner surface 119 of the inner body portion 116 may be coated with a non-stick material, such as polytetrafluoroethylene (PTFE) or anodized aluminum.

Still referring to FIG. 4, the inner body portion 116 of the teapot 100 defines an inner cavity or chamber 120. As described in more detail below, the constituent ingredients of the tea or other beverage are received in the inner chamber 120 of the teapot 100 and heated therein to prepare the beverage. Additionally, an outer chamber 121 is defined between the inner and outer body portions 116, 107, respectively. The inner chamber 120 is in fluid communication with the outer chamber 121 and the outer chamber 121 is in fluid communication with the spout 102. Accordingly, the beverage prepared in the inner chamber 120 may be poured from the inner chamber 120, through the outer chamber 121 and the spout 102, and into a cup or other beverage receptacle.

As illustrated in FIG. 4, the spout 102 projects outward and upward from the sidewall 109 of the outer body portion 107. In the illustrated embodiment, the spout 102 includes a thin-walled, cylindrical segment 122 defining a cylindrical opening 123 in fluid communication with the outer chamber 121 of the teapot 100. It will be appreciated that the spout 102 may have any other suitable shape, such as, for instance, a curved spout (e.g., an S-shaped spout) and still fall within the scope and spirit of the present disclosure.

Still referring to the embodiment illustrated in FIG. 4, the teapot 100 also includes a liquid-permeable cover or lid 124 configured to be releasably coupled to an upper end 125 of the inner body portion 116. In the illustrated embodiment, the liquid-permeable lid 124 includes a porous mesh 126 of interconnected or interlaced longitudinal and transverse strands. Additionally, in the illustrated embodiment, the liquid-permeable lid 124 includes a stiffening rim 127 extending around a periphery of the porous mesh 126. The stiffening rim 127 is configured to maintain the structural integrity of the liquid-permeable lid 124. The liquid-permeable lid 124 also includes an arcuate notch 128 extending around a periphery of the stiffening rim 127. The arcuate notch 128 is configured to receive a portion of the upper end 125 of the sidewall 117 of the inner body portion 116. The engagement between the arcuate notch 128 and the upper end 125 of the sidewall 117 of the inner body portion 116 is configured to ensure proper alignment or seating between the liquid-permeable lid 124 and the inner body portion 116. In the illustrated embodiment, the liquid-permeable lid 124 has a spherical cap shape. In one or more alternate embodiments, the liquid-permeable lid 124 may have any other suitable shape, such as, for example, a flat, circular disk. The liquid-permeable lid 124 also includes an aperture 129, such as circular opening, in the porous mesh 126, the significance of which is described below.

With continued reference to FIG. 4, the teapot 100 may also include a locking mechanism 135 configured to selectively secure the liquid-permeable lid 124 to the inner body portion 116 and selectively release the liquid-permeable lid 124 from the inner body portion 116. The locking mechanism 135 is configured to release the liquid-permeable lid 124 to facilitate the removal of the fluid-permeable lid 124, such as for inserting ingredients (e.g., milk, water, tea leaves, and spices) into the inner chamber 120 prior to preparation or for cleaning the liquid-permeable lid 124. In the illustrated embodiment, the locking mechanism 135 includes a post 136 projecting upward from the base 112 of outer body portion 107 and a thumb nut 137 configured to threadedly engage an upper threaded end 138 of the post 136. In the illustrated embodiment, the thumb nut 137 includes an annular head portion 139 and a shank 140 extending downward from the head portion 139. Additionally, the thumb nut 137 includes an internally threaded blind bore 141 extending along at least a portion of the shank 140. The head portion 139 of the thumb nut 137 may include a friction-inducing outer surface, such as, for example, a knurled surface, ridges, striations, a coating, or any combination thereof, to facilitate threading and unthreading the thumb nut 137 by hand (i.e., the thumb nut 137 is configured to be manually threaded onto, and unthreaded off of, the post 136 by hand). The post 136 is configured to extend up through the aperture 129 in the liquid-permeable lid 124. The post 136 may be configured to be press-fit (i.e., friction fit) into the aperture 129 in the liquid-permeable lid 124 or may be configured to be loose fit into the aperture 129. The extension of the post 136 up through the aperture 129 in the liquid-permeable lid 124 is configured to center the liquid-permeable lid 124 on the upper end 125 of the inner body portion 116. Additionally, the shank portion 140 of the thumb nut 137 is larger than the aperture 129 in the liquid-permeable lid 124 such that the engagement between the thumb nut 137 and the upper end 138 of the post 136 retains the liquid-permeable lid 124 on the upper end 125 of the inner body portion 116.

It will be appreciated that the locking mechanism 135 may include any other suitable type of nut to secure the liquid-permeable lid 124 to the inner body portion 116, such as, for example, a wing nut. Additionally, in the illustrated embodiment, the post 136 is concentric with the inner body portion 116, although in one or more alternate embodiments, the post 136 may be eccentric with the inner body portion 116. Moreover, although in the illustrated embodiment the post 136 is cylindrical, the post 136 may have any other suitable shape, such as, for example, a square prism, and still fall within the scope and spirit of the present disclosure. Additionally, in an alternate embodiment, the upper end of the post 136 may include an internally threaded bore and the nut may include external threads configured to threadedly engage the internally threaded bore in the post 136. Furthermore, in one or more alternate embodiments, the liquid-permeable lid 124 may be detachably coupled to the inner body portion 116 by any other suitable means, such as by magnets, a bayonet-type connector, or set screws.

With continued reference to the embodiment illustrated in FIG. 4, the outer body portion 107 also includes an upper opening 145 configured to receive the outer lid 106 (i.e., the outer lid 106 is configured to selectively cover and expose the upper opening 145 in the outer body portion 107). The teapot 100 also includes a sloped rim 146 extending around the periphery of the upper opening 145. In the illustrated embodiment, the sloped rim 146 tapers between a higher end 147 proximal to the spout 102 and a lower end 148 distal from the spout 102. The sloped rim 146 may define any suitable angle α relative to the base 112 of the outer portion 107, such as, for example, between approximately 10 degrees and approximately 35 degrees. In an alternate embodiment, the rim 146 may not be sloped relative to the base 112 of the outer body portion 107 (i.e., the rim 146 may be horizontal, rather than sloped). In another alternate embodiment, the sloped rim 146 may be sloped at an angle α greater than 35 degrees, such as, for instance, approximately 45 degrees. In the illustrated embodiment, the teapot 100 further includes an inwardly turned lip 149 extending around a periphery of the sloped rim 146. Together, the sloped rim 146 and the lip 149 are configured to reduce spilling from the teapot 100 as tea is poured out of the spout 102. In particular, the inwardly turned lip 149 is configured to reduce spilling from the teapot 100 between the outer body portion 107 and the outer lid 106. Additionally, the sloped rim 146 is configured to direct the beverage in the teapot 100 towards the spout 102 and thereby reduce spilling from the teapot 100. In particular, the sloped rim 146 is configured to reduce sloshing of the beverage in the teapot 100 as the beverage is poured through the spout 102, which is configured to reduce spilling from the teapot 100.

Still referring to the embodiment illustrated in FIG. 4, the outer lid 106 is sloped to conform to the sloped rim 146 on the outer body portion 107 of the teapot 100. In the illustrated embodiment, the outer lid 106 includes an arcuate cap 150 and an annular flange 151 extending downward from the arcuate cap 150. An annular notch 152 is defined between the annular flange 151 and a peripheral edge 153 of the arcuate cap 150. The annular notch 152 in the outer lid 106 is configured to receive a portion of the inwardly turned lip 149 on the outer body portion 107 of the teapot 100 such that the annular flange 151 may extend down into the upper opening 145 in the outer body portion 107 of the teapot 100. The engagement between the inwardly turned lip 149 on the outer body portion 107 and the annular notch 152 in the outer lid 106 is configured to ensure proper alignment between the outer lid 106 and the upper opening 145 and to prevent the outer lid 106 from inadvertently disengaging the outer body portion 107 of the teapot 100. Additionally, when the outer lid 106 is attached to the outer body portion 107 of the teapot 100, a portion of the arcuate cap 150 of the outer lid 106 overhangs at least a portion of the inwardly turned lip 149. The overlap between the arcuate cap 150 and the inwardly turned lip 149 is configured to prevent liquid from spilling out of the teapot 100 through the upper opening 145.

Additionally, the outer lid 106 includes a lid handle 155 configured to permit the user to remove the outer lid 106 from the body 101 of the teapot 100 and replace the outer lid 106 onto the body 101 of the teapot 100 to cover the upper opening 145. In the illustrated embodiment of FIG. 4, the lid handle 155 is coupled to the arcuate cap 150 by a fastener 156. In particular, an externally threaded shaft 157 on the fastener 156 extends upward through an opening 158 in the arcuate cap 150 and an internally threaded blind bore 159 in the lid handle 155 threadedly engages the externally threaded shaft 157 of the fastener 156. It will be appreciated, however, that the lid handle 155 may be coupled to the arcuate cap 150 by any other suitable means, such as welding, bonding, adhering, or any combination thereof. Additionally, in an alternate embodiment, the lid handle 155 may be integrally formed with the arcuate cap 150.

With reference now to embodiment illustrated in FIGS. 1-5, the spillway 104 is located below the spout 102 and is configured to direct fluid spilled from the spout 102 into the spill catcher 103, which is described in detail below. In the illustrated embodiment, the spillway 104 is an angled guide projecting outward from the sidewall 109 of the outer body portion 107 of the teapot 100. Moreover, the spillway 104 tapers outward between an upper end 166 coupled to the spout 102 and a relatively wider lower end 167. The spillway 104 may define any suitable angle $\beta$ relative to the sidewall 109 of the outer body portion 107, such as, for example, approximately 5 degrees to approximately 45 degrees. It will be appreciated that the spillway 104 may taper at any other suitable angle $\beta$, such as, for instance, greater than approximately 45 degrees. Accordingly, the angled spillway 104 is configured to direct spilled fluid outward away from the sidewall 109 of the outer body portion 107 and into the spill catcher 103 (i.e., fluid spilled from the spout 102 may contact the spillway 104 and then slide down along the spillway 104 and into the spill catcher 103). In one embodiment, the spillway 104 may be integrally formed with the outer body portion 107 of the teapot 100. In an alternate embodiment, the spillway 104 may be formed separately from the outer body portion 107 of the teapot 100 and coupled to the sidewall 109 of the outer body portion 107 by any suitable means, such as, for instance, welding, bonding, mechanical fastening, or any combination thereof.

With reference now to the embodiment illustrated in FIGS. 4, 5, and 7A-7C, the spill catcher 103 is coupled to the sidewall 109 of the outer body portion 107 and positioned below the spout 102. As described above, the spillway 104 is configured to direct any fluid spilled from the spout 102 into the spill catcher 103. The spill catcher 103 is configured to retain the fluid spilled from the spout 102 until it may be disposed of by the user. Additionally, in the illustrated embodiment, the spill catcher 103 is detachably coupled to the outer body portion 107 of the teapot 100 by four magnets 170. Detachably coupling the spill catcher 103 to the outer body portion 107 of the teapot 100 enables the user to remove and clean the spill catcher 103 (i.e., detachably coupling the spill catcher 103 to the outer body portion 107 of the teapot 100 enables the user to readily empty the spilled liquid captured by the spill catcher 103). It will be appreciated that the spill catcher 103 may be detachably coupled to the outer body portion 107 by any other suitable number of magnets 170, such as, for example, one to eight magnets. Additionally, the spill catcher 103 may be detachably coupled to the outer body portion 107 by any other suitable means, such as, for example, hook-and-loop type fasteners, a bungee strap configured to wrap around the sidewall 109 of the outer body portion 107, button snaps, or any combination thereof. In an alternate embodiment, the spill catcher 103 may be integrally formed with the sidewall 109 of the outer body portion 107. Additionally, in another alternate embodiment, the spill catcher 103 may be fixedly connected to the sidewall 109 of the outer body portion 107, such as by rivets or any other suitable permanent fasteners.

With continued reference to FIGS. 4 and 7A-7C, the spill catcher 103 includes an inner wall segment 171 which conforms to the contour of the sidewall 109 of the outer body portion 107 and an outer wall segment 172 extending outward from a lower end 173 of the inner wall segment 171. In the illustrated embodiment, the outer wall segment 172 defines an acute angle $\theta$, such as, for example, approximately 10 degrees to approximately 45 degrees, relative to the inner wall segment 171. It will be appreciated, however, that the outer wall segment 172 may define any other suitable angle $\theta$ relative to the inner wall segment 171, such as, for example, greater than 45 degrees. Together, the inner and outer wall segments 171, 172, respectively, of the spill catcher 103 define a wedge-shaped cavity 174 configured to receive and retain liquid spilled from the spout 102 until the spilled liquid may be disposed of by the user. Additionally, as illustrated in FIG. 2, the spill catcher 103 is configured to extend circumferentially around at least a portion of the sidewall 109 of the outer body portion 107. The spill catcher 103 may extend any suitable angle $\delta$ around the sidewall 109 of the outer body portion 107, such as, for example, approximately 10 degrees to approximately 60 degrees. It will be appreciated, however, that the spill catcher 103 may extend any other suitable angle $\delta$ around the sidewall 109 of the outer body portion 107, such as, for example, greater than 60 degrees. Additionally, in the illustrated embodiment, the spill catcher 103 also includes two opposing sidewalls 175, 176. One of the sidewalls 175 connects sides 177, 178 of the inner and outer wall segments 171, 172, respectively, together and the other sidewall 176 connects opposite sides 179, 180 of the inner and outer wall segments 171, 172, respectively, together. In an alternate embodiment, the spill catcher 103 may be provided without the sidewalls 175, 176 and the opposite sides 177, 178 and 179, 180 of the inner and outer wall segments 171, 172, respectively, may be connected directly together.

In the illustrated embodiment, the inner wall segment 171 of the spill catcher 103 includes four cylindrical recesses 181 configured to receive the magnets 170. Recessing the magnets 170 in recesses 181 is configured to permit the inner wall segment 171 of the spill catcher 103 to abut the sidewall 109 of the outer body portion 107. Otherwise, the magnets 170 would define a gap between the inner wall segment 171 of the spill catcher 103 and the sidewall 109 of the outer body portion 107, which may permit spilled fluid from the spout 102 to avoid capture by the spill catcher 103. In one or more embodiments, the recesses 181 in the inner wall segment 171 of the spill catcher 103 may have any other suitable shape, such as, for example, a square prismatic recess, depending upon the shape of the magnets 170. Additionally, in one or more embodiments, the inner wall segment 171 of the spill catcher 103 may be provided without the recesses 181, depending upon the type of fasteners used to detachably couple the spill catcher 103 to the outer body portion 107, such as, a bungee strap configured to wrap around the sidewall 109 of the outer body portion 107. In one or more alternate embodiments, the teapot 100 may be provided without the spill catcher 103.

With reference now to the embodiment illustrated in FIGS. 1-6, the handle 105 extends outward from the sidewall 109 of the outer body portion 107. In the illustrated embodiment, the handle 105 is located on the sidewall 109 approximately 90 degrees apart from the spout 102 (i.e., the handle 105 is positioned on the sidewall 109 such that an angle Δ of approximately 90 degrees is defined between the handle 105 and the spout 102, as illustrated in FIG. 2). In or more alternate embodiments, the handle 105 may be located at any other position on the sidewall 109 such that the handle 105 may define any other suitable angle Δ relative to the spout 102, such as between approximately 30 degrees and approximately 180 degrees. For instance, in one embodiment, the handle 105 and the spout 102 are diametrically opposed from each other on the cylindrical sidewall 109 of the outer body portion 107. Additionally, although in the illustrated embodiment the handle 105 extends horizontally outward from the cylindrical sidewall 109 of the outer body portion 107, the handle 105 may extend upward or downward from the outer body portion 107 and still fall within the scope and spirit of the present disclosure. For instance, in one embodiment, the handle 105 may extend upward from the cylindrical sidewall 109 of the outer body portion 107 at an angle of approximately 45 degrees.

In the illustrated embodiment of FIGS. 1-4, the handle 105 includes a plurality of helically wound strands 182. The handle 105 may include any suitable number of strands 182, such as, for example, three to twenty strands. It will be appreciated, however, that the handle 105 may have any other suitable number of strands 182, such as more than twenty. The handle 105 also includes an inner, closely spaced segment 183 of strands 182 and an outer, loosely spaced segment 184 of strands 182. The inner, closely spaced segment 183 of strands 182 defines a diameter $D_1$ and the outer, loosely spaced segment 184 of strands 182 defines a diameter $D_2$. In the illustrated embodiment, the diameter $D_2$ of the outer segment 184 is approximately twice as large as the diameter $D_1$ of the inner segment 183. In one or more alternate embodiments, the diameter $D_2$ of the outer segment 184 of strands 182 may be any other size relative to the diameter $D_1$ of the inner segment 183, such as, for instance, more than twice as large as the diameter $D_1$ of the inner segment 183. Additionally, in one embodiment, the strands 182 may define a substantially constant diameter along the length of the handle 105 (i.e., the diameter $D_2$ of the outer segment 184 of strands 182 may be substantially equal to the diameter $D_1$ of the inner segment 183 of strands 182). The outer, loosely spaced segment 184 of strands 182 is configured to enable the user to ergonomically grasp the handle 105. Additionally, the outer, loosely spaced segment 184 of strands 182 is configured to function as a heat sink by dissipating heat (i.e., the handle 105 is configured to dissipate heat generated during preparation of tea in the stovetop teapot 100). Accordingly, the outer segment 184 of the handle 105 is configured to remain sufficiently cool such that the user may safely grasp the handle 105 without the aid of protective wear, such as an oven mitt.

With continued reference to FIGS. 1-4, an inner end 185 of the handle 105 may be coupled to the sidewall 109 of the outer body portion 107 by any suitable means, such as, for example, welding (e.g., spot welding). In the illustrated embodiment, an outer end 186 of the handle 105 includes a cap 187 configured to prevent the strands 182 from separating from each other and thereby reducing the structural integrity of the handle 105 (i.e., the cap 187 is configured to couple the outer ends of the strands 182 together, thereby preventing the strands 182 from unwinding). Additionally, the cap 187 protects the user during use of the teapot 100. Otherwise, the outer ends of the relatively small strands 182 may form sharp points against which the user could inadvertently cut his hand while handling the teapot 100. In one or more alternate embodiments, the handle 105 may be provided without the cap 187 and the outer ends of the strands 182 may be coupled together by any other suitable means, such as, for example, bonding, welding, soldering, crimping, or any combination thereof. Additionally, in one or more embodiments, the teapot 100 may include any other suitable type of handle 105. Furthermore, the handle 105 may coated in one or more thermally insulating coatings, such as, for example, high temperature resistant rubbers or polymers, such that the user may safely grip the handle 105 without the aid of protective wear, such as oven mitts.

With reference now to FIGS. 1-4, the operation of the teapot 100 will now be described. As illustrated in FIG. 3, the outer lid 106 is first removed to expose the outer chamber 121 in which the inner body portion 116 is housed. The locking mechanism 135 securing the liquid-permeable inner lid 124 to the upper end 125 of the inner body portion 116 is then disengaged (e.g., by unthreading the thumb nut 137 from the threaded upper end 138 of the post 136) and the liquid-permeable lid 124 covering the inner body portion 116 may be removed. Tea-making ingredients (e.g., milk, water, spices, and/or tea leaves) may then be placed into the inner chamber 120. The liquid-permeable inner lid 124 may then be re-secured to the upper end 125 of the inner body portion 116, such as, for example, by sliding the inner lid 124 down along the post 136 such that the threaded upper end 138 of the post 136 extends through the aperture 129 in the inner lid 124 and then threading the thumb nut 137 onto the threaded upper end 138 of the post 136. The outer lid 106 may then be returned to cover the upper opening 145 in the outer body portion 107 of the teapot 100, as illustrated in FIG. 2.

The teapot 100 may then be placed on a stovetop or other suitable heat source. It will be appreciated that the conductive material of the base 112 of the teapot 100 is configured to distribute heat throughout the body 101 of the teapot 100, including the inner body portion 116 of the teapot 100, such that the ingredients in the inner chamber 120 are heated by the heat source. The ingredients in the inner chamber 120 may then be heated to any suitable temperature. If the ingredients are brought to a boil, the boiling liquids may flow out of the inner chamber 120, up through the liquid-permeable inner lid 124, and into the outer chamber 121. Accordingly, the dual-chamber configuration of the teapot 100 is configured to prevent boiling liquids from overflowing or spilling out of the teapot 100 and onto the stovetop, which may present a safety risk. Instead, the outer chamber 121 of the teapot 100 is configured to retain boiling liquids flowing out of the inner chamber 120.

Once the ingredients in the teapot 100 have been heated to the desired temperature, the user may grasp the handle 105 and tilt the spout 102 down towards a cup or other receptacle (e.g., a thermos) into which the user desires to pour the prepared beverage (e.g., tea). As described above, in one embodiment the handle 105 is configured to dissipate heat such that the handle 105 remains sufficiently cool to enable the user to safely grasp the handle 105 without the aid of any protective wear, such as an oven mitt. Additionally, as described above, the height $H_I$ of the sidewall 117 of the inner body portion 116 is less than a height $H_O$ of the sidewall 109 of the outer body portion 107. Accordingly, as the user tilts the spout 102 downward towards the cup or other receptacle, the liquid ingredients in the inner chamber 120 are configured to pour out of the upper end 125 of the inner chamber 120, through the liquid-permeable inner lid 124, and into the outer chamber 121 of the teapot 100. As the liquid flows from the inner chamber 120 to the outer chamber 121, the liquid-permeable lid 124 filters out large solid ingredients (e.g., cinnamon sticks or ginger root) in the tea (i.e., the liquid-permeable inner lid 124 is configured to permit the flow of liquid but restrict the flow of solid matter, thereby retaining the solid matter in the inner chamber 120 of the teapot 100). Accordingly, the liquid-permeable lid 124 is configured to prevent large solid matter from flowing into the spout 102, which might obstruct or restrict the flow of the prepared beverage from the spout 102. The prepared beverage then flows from the outer chamber 121, out through the spout 102, and into the cup or other receptacle. Additionally, as described above, the spillway 104 is configured to direct any liquid spilled from the spout 102 into the spill catcher 103 positioned below the spout 102 (i.e., any liquid spilled from the spout 102 will flow down along the spillway 104 and into the wedge-shaped cavity 174 of the spill catcher 103). Subsequently, the user may detach the spill catcher 103 from the outer body portion 107 of the teapot 100 (e.g., by pulling with sufficient force to detach the magnets 170 on the spill catcher 103 from the sidewall 109 of the outer body portion 107) in order to empty and clean the spill catcher 103. Additionally, the outer lid 106 and the inner lid 124 may be removed to empty and clean the outer and inner chambers 121, 120 of the teapot 100.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. Although relative terms such as "outer," "inner," "upper," "lower," "below," "above," "vertical," "horizontal," and similar terms have been used herein to describe a spatial relationship of one element to another, it is understood that these terms are intended to encompass different orientations of the various elements and components of the invention in addition to the orientation depicted in the figures. Additionally, as used herein, the term "substantially" and similar terms are used as terms of approximation and not as terms of degree, and are intended to account for the inherent deviations in measured or calculated values that would be recognized by those of ordinary skill in the art.

What is claimed is:

1. A heat sinking teapot, comprising:
an outer body defining a chamber for storing a fluid;
a spout coupled to the outer body and in fluid communication with the chamber; and
a rigid handle coupled to the outer body, wherein the rigid handle comprises a plurality of helically wound strands, at least a portion of each helically wound strand of the plurality of helically wound strands is spaced apart by a gap from at least a portion of an adjacent helically wound strand of the plurality of helically wound strands such that the rigid handle is configured to dissipate heat, the plurality of helically wound strands comprising:
an inner segment of closely wound strands proximate to the outer body having a first diameter and a first length; and
an outer segment of loosely wound strands distal to the outer body having a second diameter and a second length, the second diameter being larger than the first diameter and the second length being at least as long as the first length to facilitate ergonomic grasping of the outer segment by a user.

2. The heat sinking teapot of claim 1, wherein the second diameter is twice as large as the first diameter.

3. The heat sinking teapot of claim 1, wherein the handle includes from three to six strands.

4. The heat sinking teapot of claim 1, wherein the handle is oriented 90 degrees relative the spout.

5. The heat sinking teapot of claim 1, wherein the handle is opposite the spout.

6. The heat sinking teapot of claim 1, further comprising a cap coupled to outer ends of the strands.

7. The heat sinking teapot of claim 1, wherein outer ends of the strands are coupled together.

8. The heat sinking teapot of claim 1, further comprising a thermally insulating coating covering at least a portion of the handle.

9. The heat sinking teapot of claim 1, wherein the handle extends upward from the outer body.

10. The heat sinking teapot of claim 1, wherein the handle extends downward from the outer body.

11. The heat sinking teapot of claim 1, wherein a material of the handle is dissimilar to a material of the outer body.

12. The heat sinking teapot of claim 1, further comprising:
an inner body housed in the outer body;
an inner chamber defined by the inner body; and
an outer chamber defined between the outer body and the inner body, wherein the inner chamber is in fluid communication with the outer chamber and the outer chamber is in fluid communication with the spout.

13. The heat sinking teapot of claim 1, further comprising a lid configured to cover an upper opening defined by the outer body.

14. The heat sinking teapot of claim 1, further comprising a spill catcher coupled to the outer body below the spout.

* * * * *